US012695089B2

(12) United States Patent
Zhao et al.

(10) Patent No.: US 12,695,089 B2
(45) Date of Patent: Jul. 28, 2026

(54) BATTERY AND ELECTRIC DEVICE

(71) Applicant: JIANGSU ZENERGY BATTERY TECHNOLOGIES GROUP CO., LTD., Suzhou (CN)

(72) Inventors: Huiwen Zhao, Jiangsu (CN); Yeqiong Zhang, Jiangsu (CN); Haixu Huang, Jiangsu (CN); Silin Li, Jiangsu (CN); Chuanjian Zhang, Jiangsu (CN); Kecheng Jiang, Jiangsu (CN)

(73) Assignee: JIANGSU ZENERGY BATTERY TECHNOLOGIES GROUP CO., LTD., Suzhou (CN)

( * ) Notice: Subject to any disclaimer, the term of this patent is extended or adjusted under 35 U.S.C. 154(b) by 618 days.

(21) Appl. No.: 18/195,224

(22) Filed: May 9, 2023

(65) Prior Publication Data

US 2024/0055588 A1 Feb. 15, 2024

(30) Foreign Application Priority Data

Aug. 12, 2022 (CN) .......................... 202210968049.0

(51) Int. Cl.
H01M 4/505 (2010.01)
H01M 4/02 (2006.01)
(Continued)

(52) U.S. Cl.
CPC ........... H01M 4/505 (2013.01); H01M 4/131 (2013.01); H01M 4/525 (2013.01); *H01M 2004/028* (2013.01)

(58) Field of Classification Search
CPC ...... H01M 4/131; H01M 4/505; H01M 4/525; H01M 2004/028; C01P 2004/61
See application file for complete search history.

(56) References Cited

U.S. PATENT DOCUMENTS

2018/0145322 A1* 5/2018 Choi ...................... H01M 4/366
2021/0126242 A1* 4/2021 Du ......................... C01G 53/42

FOREIGN PATENT DOCUMENTS

CN 101820063 A 9/2010
CN 111384372 A 7/2020
CN 113140700 * 7/2021

OTHER PUBLICATIONS

English translation of CN Publication 113140700, Jul. 2021.*
The first Office Action of counterpart DE application No. 102023110731.3 issued on Mar. 10, 2026.

* cited by examiner

*Primary Examiner* — Brittany L Raymond
(74) *Attorney, Agent, or Firm* — The Sun IP Law

(57) ABSTRACT

The present disclosure belongs to the technical field of secondary batteries, and in particular, to a battery and an electric device. A capacity voltage difference ratio of the battery in a capacity test at 45° C. and 1/1C, which is the ratio of an intensity maximum value Q1 between a high-nickel H2-H3 phase transition peak 3.9-4.2 V to an intensity Q2 at 3.9 V of the battery satisfies $1<Q1:Q2\leq1.6$; a positive electrode sheet of the battery comprises a positive electrode active material, and the positive electrode active material comprises a transition metal oxide A: $Li_{a1}(Ni_{x1}Co_{y1}Mn_{z1}G_{b1})O_{2-c1}D_{c1}$, and a transition metal oxide B: $Li_{a2}(Ni_{x2}Co_{y2}Mn_{z2}M_{b2})O_{2-c2}E_{c2}$. The positive electrode active material provided in the present disclosure can take into account lower costs, low-temperature dynamic performance, high-temperature cycle performance and high-temperature storage performance.

14 Claims, 2 Drawing Sheets

(51) Int. Cl.
    *H01M 4/131*            (2010.01)
    *H01M 4/525*            (2010.01)

BATTERY AND ELECTRIC DEVICE

TECHNICAL FIELD

The present disclosure belongs to the technical field of secondary batteries, and in particular, to a battery and an electric device.

BACKGROUND

A lithium ion secondary battery is a rechargeable battery, works by mainly relying on lithium ions moving between a positive electrode and a negative electrode, and is a clean energy source widely applied at present. A lithium ion battery positive electrode material is an important constituent part of a lithium ion secondary battery, not only serves as an electrode material to participate in an electrochemical reaction, but also serves as a lithium ion source, and therefore a positive electrode active material plays a vital role in the exertion of battery performance. Layered oxide positive electrode materials are widely applied in power/battery energy storage system (ESS) field due to their superior comprehensive performance.

Better-than-expected development of the global new-energy vehicle market brings about explosive growth of the lithium battery industry, and also higher requirements are put forward for the performance and cost of power batteries. Lithium-nickel-cobalt-manganese layered ternary positive electrode materials have become the first choice for commercialized high-energy-density high-performance cells due to their high capacity per gram and long cycle life. The high-energy-density layered ternary positive electrode materials are mainly divided into two directions: high-nickel ternary positive electrode materials and medium-nickel high-voltage ternary positive electrode materials. For the high-nickel ternary positive electrode materials, due to high nickel content, the cost of cells will increase, and also long-term stability and safety will also decrease greatly. Therefore, from the perspective of safety and cost of batteries, compared with the high-nickel ternary positive electrode materials, the medium-nickel high-voltage ternary positive electrode materials have certain advantages in terms of safety, but there are still certain gaps in terms of watt-hour cost and energy density. Reducing the content of cobalt in a lithium-nickel-cobalt-manganese ternary layered oxide positive electrode material can reduce the use of rare resource, i.e. cobalt materials, which significantly reduces the costs of ternary materials. Therefore, a high-voltage medium-nickel layered oxide positive electrode composed of a low cobalt or no cobalt has gradually become a hotspot in research and practical applications.

Cobalt mainly functions to stabilize a structure and improve dynamic performance in a ternary layered positive electrode material. However, for a medium-nickel low-cobalt or cobalt-free layered positive electrode material, due to the composition of low-cobalt or no cobalt thereof, there are problems that a direct-current internal resistance is high in low-temperature and low-SOC (State of Charge) and a direct-current internal resistance during a long-term cycle increases too fast. Currently, the problems are solved mainly by means of doping and cladding. Although the problems that a direct-current internal resistance is high in low-temperature and low-SOC (State of Charge) and a cycle DCR (direct-current resistance) increases fast can be ameliorated to a certain extent, there is still a certain gap from demands of market applications.

SUMMARY

A first object of some embodiments of the present disclosure is: in view of the shortcomings of the prior art, a battery is provided; and the battery has the advantages of low cost and compatibility with performance in various aspects; and by means of a design of the composition and mixing ratio of a medium-nickel low-cobalt or cobalt-free layered positive electrode material and a high-nickel ternary layered positive electrode material, the energy density, low-temperature low-SOC direct-current internal resistance and increase of cycle direct-current internal resistance are optimized, while taking account of costs and cycle stability.

In order to achieve the described object, some embodiments of the present disclosure adopt the following technical solution:

A battery, wherein a capacity voltage difference ratio of the battery in a capacity test at 45° C. and 1/1C, which is the ratio of an intensity maximum value Q1 between a high-nickel H2-H3 phase transition peak 3.9-4.2 V to an intensity Q2 at 3.9 V of the battery satisfies $1<Q1:Q2\leq1.6$; the battery comprises a positive electrode sheet, the positive electrode sheet comprises a positive electrode current collector and a positive electrode coating provided on at least one surface of the positive electrode current collector, and the positive electrode coating comprises a positive electrode active material, the positive electrode active material comprises a transition metal oxide A and a transition metal oxide B, the chemical formula of the transition metal oxide A is $Li_{a1}(Ni_{x1}Co_{y1}Mn_{z1}G_{b1})O_{2-c1}D_{c1}$, and in the formula, $0.8\leq a1\leq1.2$, $0.5\leq x1\leq0.65$, $0\leq y1<0.13$, $0.23<z1\leq0.5$, $0\leq b1\leq0.1$, $0\leq c1<0.1$, $x1+y1+z1+b1=1$, G is one or more of Mg, Ca, Ce, Y, Al, Sn, Ti, Zr, W, Sr, La, Ba, Co, Mo, Cr and B; D is one or more of N, F, S, Cl, Br and I; the chemical formula of the transition metal oxide B is $Li_{a2}(Ni_{x2}Co_{y2}Mn_{z2}M_{b2})O_{2-c2}E_{c2}$, $0.8\leq a2\leq1.2$, $0.75\leq x2<1$, $0<y2<0.13$, $0<z2\leq0.25$, $0\leq b2\leq0.1$, $0\leq c1\leq0.1$, $x2+y2+z2+b2=1$, M is one or more of Mg, Ca, Ce, Y, Al, Sn, Ti, Zr, W, Sr, La, Ba, Co, Mo, Cr and B; and E is one or more of N, F, S, Cl, Br and I. Preferably, $1<Q1:Q2\leq1.5$, more preferably, $1<Q1:Q2\leq1.4$.

Preferably, $3(m*x1+n*x2)+10(m*y1+n*y2)-1.5(m*z1+n*z2)=R$, $1.2\leq R<3.5$, where m and n represent the mass fractions of the transition metal oxide A and the transition metal oxide B, respectively.

Preferably, the parts by weight ratio of the transition metal oxide A to the transition metal oxide B is 0.7-0.99:0.01-0.3, more preferably, 0.75-0.95:0.05-0.25.

Preferably, the particle distribution particle size of the positive electrode active material satisfies: $Dv_{10}\geq0.5$ μm and $2$ μm$\leq Dv_{50}\leq7$ μm.

Preferably, the particle size distribution of the positive electrode active material satisfies: $0.5<(Dv_{90}-Dv_{10})/Dv_{50}<4$.

Preferably, at least a part of the positive electrode active material is in a single crystal or single crystal-like morphology. A layered ternary positive electrode material of a secondary spherical particle morphology has defects such as low compressive strength, particle breakage during a cycle and intolerance to a high voltage system, etc. So the layered ternary positive electrode material of single crystal or single crystal-like morphology has few crystal boundaries, high hardness, is not easy to break, and is a preferable material for high-voltage applications.

Preferably, the compaction density of the positive electrode coating is 3.1 $g/cm^3$-3.7 $g/cm^3$.

Preferably, the positive electrode coating comprises raw materials of the following parts by weight: 80-99 parts of the positive electrode active material, 0.5-10 parts of a binder and 0.5-10 parts of a conductive agent.

Preferably, the positive electrode coating comprises raw materials of the following parts by weight: 93-99 parts of the positive electrode active material, 1-4 parts of a binder and 1-3 parts of a conductive agent.

A second object of some embodiments of the present disclosure is: in view of the shortcomings of the prior art, an electric device is provided; and the electric device has a large capacity, a long cycle life and good safety.

In order to achieve the described object, some embodiments of the present disclosure adopt the following technical solution:

an electric device, comprising the described battery.

Compared with the related art, the beneficial effects of some embodiments of the present disclosure lie in that: a battery is provided; and the battery has the advantages of low cost and compatibility with performance in various aspects; by means of a design of the composition and mixing ratio of a medium-nickel low-cobalt or cobalt-free layered positive electrode and a high-nickel ternary layered positive electrode material in single crystal or single crystal-like, the energy density, direct-current internal resistance in low-temperature low-SOC and increase of cycle direct-current internal resistance are optimized, while taking account of costs and cycle stability.

DETAILED DESCRIPTION OF THE EMBODIMENTS

Figure 1:
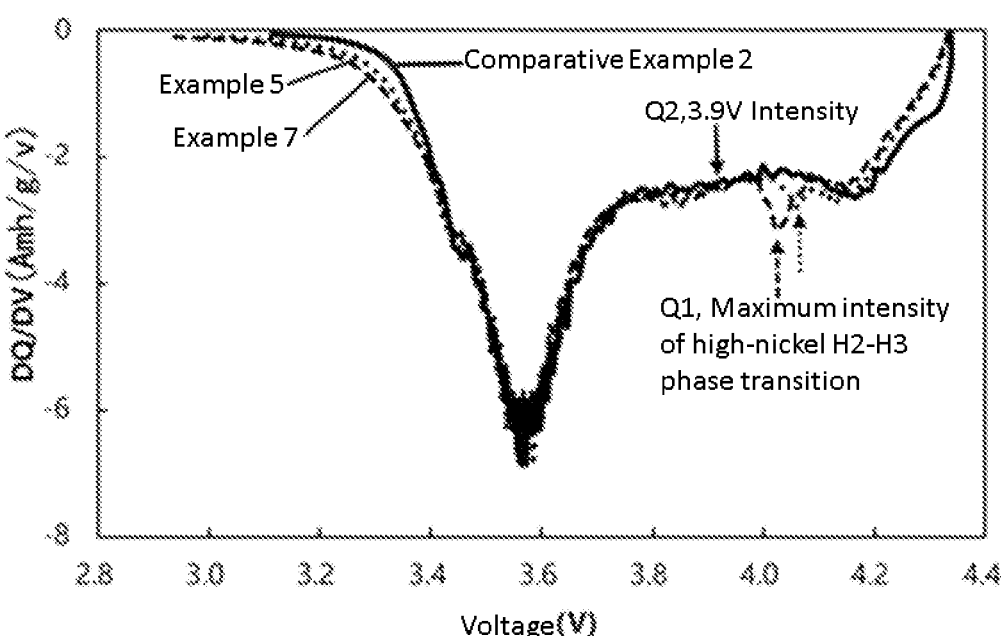
FIG. 1 is a comparison diagram of discharge voltage differential curves at 45° C. of Examples 5 and 7 and Comparative Example 2 of the present disclosure.

Hereinafter, some embodiments of the present disclosure will be further described in detail in conjunction with specific embodiments and accompanying drawing of the description, but the embodiments of the present disclosure are not limited thereto.

A battery, wherein a capacity voltage difference ratio of the battery in a capacity test at 45° C. and 1/1C, which is the ratio of an intensity maximum value Q1 between a high-nickel H2-H3 phase transition peak 3.9-4.2 V to an intensity Q2 at 3.9 V of the battery satisfies 1<Q1:Q2≤1.6; the battery comprises a positive electrode sheet, the positive electrode sheet comprises a positive electrode current collector and a positive electrode coating provided on at least one surface of the positive electrode current collector, and the positive electrode coating comprises a positive electrode active material, the positive electrode active material comprises a transition metal oxide A and a transition metal oxide B, the chemical formula of the transition metal oxide A is $Li_{a1}(Ni_{x1}Co_{y1}Mn_{z1}G_{b1})O_{2-c1}D_{c1}$, in the formula, 0.8≤a1≤1.2, 0.5≤x1≤0.65, 0≤y1<0.13, 0.23<z1≤0.5, 0<b1<0.1, 0≤c1<0.1, x1+y1+z1+b1=1, G is one or more of Mg, Ca, Ce, Y, Al, Sn, Ti, Zr, W, Sr, La, Ba, Co, Mo, Cr and B; D is one or more of N, F, S, Cl, Br and I; the chemical formula of the transition metal oxide B is $Li_{a2}(Ni_{x2}Co_{y2}Mn_{z2}M_{b2})O_{2-c2}E_{c2}$, 0.8≤a2≤1.2, 0.75≤x2<1, 0<y2<0.13, 0<z2≤0.25, 0≤b2≤0.1, 0≤c1≤0.1, x2+y2+z2+b2=1, M is one or more of Mg, Ca, Ce, Y, Al, Sn, Ti, Zr, W, Sr, La, Ba, Co, Mo, Cr and B; and E is one or more of N, F, S, Cl, Br and I.

Cobalt mainly functions to stabilize a structure and improve dynamic performance in a ternary layered positive electrode material. In addition to being affected by the content of cobalt, the dynamic performance of lithium-nickel-cobalt-manganese layered oxide is also greatly affected by the contents of nickel and manganese. This is because in the ternary material, Co is +3 valence, Ni is +2/+3 valence and Mn is +4 valence, when a charge/discharge voltage is less than 4.4 V, $Ni^{2+/3+}$ mainly participates in a chemical reaction to generate $Ni^{4+}$. Compared with a strong metal bond between $Ni^{3+}$ and oxygen, metal bonds between $Ni^{2+}$ and $Mn^{4+}$ and oxygen are weaker, so that a Li—O metal bond energy is increased, such that the diffusion speed of Li ions is slow. Compared with the medium-nickel low-cobalt or cobalt-free composition, a high-nickel layered lithium transition metal oxide positive electrode material has advantages of high energy density and good dynamic performance due to high $Ni^{3+}$ content and low $Mn^{4+}$ content. The single crystal or single crystal-like medium-nickel low-cobalt or cobalt-free transition metal oxide A is mixed with the single crystal or single crystal-like high-nickel transition metal oxide B at a certain ratio. The low-temperature low-SOC dynamic performance of the medium-nickel low-cobalt or cobalt-free material can be effectively improved by the difference between the dynamic performances and terminal discharge platforms of the two. SOC (State of Charge), also referred to as remaining battery level, represents a ratio of the remaining capacity of a battery after the battery has been used for a period of time or the battery has been left unused for a long period of time to the capacity of its fully charged state, which is usually represented by a percentage. During a test, the voltage of a DCR (direct-current resistance) does not change along with the continuation of time. That is to say, a voltage frequency is 0, and it represents the capacity of a component to block a direct current. After the discharge process of the battery ends, due to polarization, the voltage of the battery may rebound. A direct-current resistance technology is to calculate, in an intermittent discharge process of the battery, the internal resistance of the battery by a voltage difference between a voltage at an instant before the end of discharge and a stable voltage after the end of discharge. DCR (direct-current resistance) is more applicable to battery enterprises and the like, and is used to evaluate the capability of discharge power or energy thereof or the resistance value of a test battery module or pack.

In the process of a normal-temperature cycle, for a medium-nickel low-cobalt or cobalt-free layered positive electrode material, lithium deintercalation is more difficult at high and low SOC, and a phase transition easily occurs on the surface of the material after long-term cycle, which not only causes capacity attenuation, but also increases the direct-current internal resistance dramatically; and mixing with high nickel can reduce the lithium intercalation pressure of the medium-nickel low-cobalt or cobalt-free layered positive electrode material at high and low SOC, and ameliorate the increase of the direct-current internal resistance during a cycle. Furthermore, using high nickel in a single crystal or single crystal-like morphology can also ensure a relatively stable structure during a high-voltage cycle, thereby avoiding a relatively large capacity loss caused by mixing high nickel during the cycle.

In a charge/discharge process of the high-nickel layered lithium transition metal oxide positive electrode, when the voltage is 4.0 V or greater, H2 and H3 phase transition starts to occur, and along with sudden shrinkage or expansion of unit cells in a c-axis direction. A large volume change occurs to generate a micro-stress, thereby causing a micro-crack, and a micro-crack easily occurs on an electrolyte at a high temperature, which significantly deteriorates the cycle performance. Along with the increase of the nickel content, the intensity of H2-H3 phase transition also increases continuously, and the effect on the cycle performance becomes more and more obvious. The H2-H3 phase transition will significantly deteriorate the high-nickel high-temperature cycle and storage performance. The composition and content of the single crystal or single crystal-like high-nickel transition metal oxide B are limited, so that the H2-H3 phase transition of 4.0 V or greater is controlled within a relatively small range. Thereby it greatly reduces negative effect brought about by high-temperature cycle and storage under a high voltage of the single crystal or single crystal-like high-nickel transition metal oxide B on the medium-nickel low-cobalt or cobalt-free material in a main body. Balance of low-temperature dynamic performance, cycle performance and storage performance in a medium-nickel low-cobalt high-voltage high-energy battery system is effectively achieved.

The positive electrode active material comprises the transition metal oxide A and the transition metal oxide B, wherein the transition metal oxides A and B are both of single crystal or single crystal-like structures. The positive electrode sheet further comprises a binder and a conductive agent. The binder may be selected from at least one of polyvinyl alcohol, polytetrafluoroethylene, polyvinylidene fluoride, sodium carboxymethyl cellulose, aqueous acrylic resin, ethylene-vinyl acetate copolymer, styrene butadiene rubber, fluorinated rubber, and polyurethane. The conductive agent may be selected from a carbon material, and selected from at least one of graphite, carbon black, graphene and carbon nanotube conductive fiber. Common conductive agents comprise ketjen black, SP, S—O, KS-6, acetylene black and VGCF. Optional conductive agents also comprise metal powder, conductive whiskers, conductive metal compounds, conductive polymers, etc.

In order to further optimize costs and dynamic performance, the transition metal oxide A and the transition metal oxide B are both layered, and the compositions and mixing ratio of the transition metal oxide A and the transition metal oxide B satisfy: $3(m*x1+n*x2)+10(m*y1+n*y2)-1.5(m*z1+n*z2)=R$, $1.2 \leq R < 3.5$, m and n represent the mass fractions of the transition metal oxide A and the transition metal oxide B, respectively. Preferably, $1.5 \leq R < 3.5$, $1.8 \leq R < 3.5$, $1.9 \leq R < 3.5$, $1.9 \leq R < 3.2$, $1.9 \leq R < 3.0$, $1.9 \leq R < 2.8$, $1.9 \leq R < 2.5$, $1.9 \leq R < 2.5$ and $2.0 \leq R < 2.2$.

Preferably, the parts by weight ratio of the transition metal oxide A to the transition metal oxide B is 0.7-0.99:0.01-0.3. The parts by weight ratio of the transition metal oxide A to the transition metal oxide B are 0.7-0.99:0.01-0.3, 0.7-0.97:0.05-0.3, 0.7-0.95:0.06-0.3, 0.75-0.99:0.1-0.3, 0.75-0.92:0.01-0.3, 0.78-0.92:0.01-0.3 and 0.8-0.9:0.01-0.3.

Preferably, the particle size distribution of the positive electrode active material satisfies: $Dv_{10} \geq 0.5$ μm and 2 μm $\leq Dv_{50} \leq 7$ μm. Specifically, $Dv_{10}$ is 0.5 μm, 0.6 μm, 0.7 μm, 0.8 μm, 0.9 μm and 1.0 μm. $Dv_{50}$ is 2 μm, 3 μm, 4 μm, 5 μm, 5.5 μm, 6 μm and 7 μm. The positive electrode material provided in some embodiments of the present disclosure is a mixed material of a layered transition metal oxide A (medium-nickel low-cobalt or cobalt-free single crystal or single crystal-like) with a relatively wide particle size distribution and a transition metal oxide B (high-nickel single crystal or single crystal-like) with a relatively narrow particle size distribution. By controlling the particle size distributions of the two active materials, the compaction density after mixing is improved, and also excellent dynamic performance and cycle performance are ensured.

Preferably, the particle size distribution of the positive electrode active material satisfies: $0.5 < (Dv_{90} - Dv_{10})/Dv_{50} < 4$.

Preferably, at least a part of the positive electrode active material is in a single crystal or single crystal-like morphology. A layered ternary positive electrode material of a secondary spherical particle morphology has defects such as low compressive strength, particle breakage during a cycle and intolerance to a high voltage system, etc. So the layered ternary positive electrode material of single crystal or single crystal-like morphology has few crystal boundaries, high hardness, is not easy to break, and is a preferable material for high-voltage applications.

Preferably, the compaction density of the positive electrode coating is 3.1 g/cm³-3.7 g/cm³. Preferably, the compaction density of the positive electrode coating is 3.1 g/cm³-3.7 g/cm³, 3.2 g/cm³-3.65 g/cm³, 3.4 g/cm³-3.6 g/cm³. Specifically, the compaction density of the positive electrode coating is 3.1 g/cm³, 3.2 g/cm³, 3.3 g/cm³, 3.4 g/cm³ and 3.5 g/cm³.

Preferably, the positive electrode coating comprises raw materials of the following parts by weight: 80-99 parts of the positive electrode active material, 0.5-10 parts of a binder and 0.5-10 parts of a conductive agent. Preferably, the positive electrode coating comprises raw materials of the following parts by weight: 93-99 parts of the positive electrode active material, 1-4 parts of a binder and 1-3 parts of a conductive agent. Preferably, the parts by weight of the positive electrode active material are 80-85 parts, 85-90 parts, 90-95 parts and 95-99 parts; specifically, the parts by weight of the positive electrode active material are 80 parts, 84 parts, 85 parts, 88 parts, 90 parts, 92 parts, 95 parts, 96 parts, 97 parts, and 99 parts. The parts by weight of the binder are 0.5-10 parts, preferably, the parts by weight of the binder are 0.5-5 parts and 5-10 parts; specifically, the parts by weight of the binder are 0.5 parts, 1.5 parts, 4 parts, 5 parts, 7 parts, 8 parts and 10 parts. The parts by weight of the conductive agent are 0.5-10 parts, and preferably, the parts by weight of the conductive agent are 0.5-5 parts and 5-10 parts; specifically, the parts by weight of the conductive agent are 0.5 parts, 2 parts, 4 parts, 5 parts, 7 parts, 8 parts and 10 parts.

An electric device, comprising the described battery. While taking account of costs and cycle stability, the energy density, low-temperature low-SOC direct-current internal resistance and increase of cycle direct-current internal resistance can be optimized.

Example 1

1. Preparation of a positive electrode sheet: a positive electrode active material A ($LiNi_{0.55}Co_{0.1}Mn_{0.35}O_2$), a positive electrode active material B ($LiNi_{0.75}Co_{0.15}Mn_{0.1}$), conductive carbon, and a binder polyvinylidene fluoride (PVDF) are sufficiently stirred and mixed at a weight ratio of 86.4:9.6:3:1 in an N-methylpyrrolidone solvent system, so as to form a uniform positive electrode slurry; the slurry is coated on a positive electrode current collector Al foil, and after drying, an electrode sheet is cold-pressed to designed compaction, and split into strips to obtain a positive electrode sheet.

2. Preparation of a negative electrode sheet: a negative electrode active material, graphite, conductive carbon, and a carboxymethyl cellulose (CMC) binder i.e. styrene butadiene rubber (SBR) are sufficiently stirred and mixed at a weight ratio of 95:2:1.5:1.5 in an appropriate amount of water solvent, such that they form a uniform negative electrode slurry; and the slurry is coated on a negative electrode current collector Cu foil, and after drying, an electrode sheet is cold-pressed to designed compaction, and is split into strips to obtain a negative electrode sheet.

3. Preparation of an electrolyte: ethylene carbonate, methyl ethyl carbonate, and diethyl carbonate are mixed at a volume ratio of 1:1:1, and $LiPF_6$ is added to form a 1M solution for standby use as an electrolyte.

4. Preparation of a separation film: a PE diaphragm is used.

5. Preparation of a battery: the positive electrode sheet, the separation film and the negative electrode sheet are stacked in sequence, so that the separation film is located between the positive electrode sheet and the negative electrode sheet to achieve a separation effect, and it is ensured that the film surface size of the negative electrode sheet is larger than that of the positive electrode, and a positive electrode tab and a negative electrode tab are fixed by welding to form bare cells which are placed in an outer packaging housing, dried and then injected with an electrolyte. Finally, after processes of formation and capacity division, etc. and complete sealing, a battery product is obtained.

Example 2

Example 2 differs from Example 1 in that: the positive electrode sheet is made by mixing a positive electrode active material A ($LiNi_{0.55}Co_{0.1}Mn_{0.35}O_2$), a positive electrode active material B ($LiNi_{0.33}Co_{0.12}Mn_{0.05}O_2$), a conductive agent acetylene black, and a binder polyvinylidene fluoride (PVDF) at a ratio of 86.4:9.6:3:1.

The remaining is the same as that in Example 1, and will not be repeated here.

Example 3

Example 3 differs from Example 1 in that: the positive electrode sheet is made by mixing a positive electrode active material A ($LiNi_{0.55}Co_{0.1}Mn_{0.35}O_2$), a positive electrode active material B ($LiNi_{0.9}Co_{0.06}Mn_{0.04}O_2$), a conductive agent acetylene black, and a binder polyvinylidene fluoride (PVDF) at a ratio of 86.4:9.6:3:1.

The remaining is the same as that in Example 1, and will not be repeated here.

Example 4

Example 4 differs from Example 1 in that: the positive electrode sheet is made by mixing a positive electrode active material A ($LiNi_{0.6}Co_{0.05}Mn_{0.35}O_2$), a positive electrode active material B ($LiNi_{0.33}Co_{0.12}Mn_{0.05}O_2$), a conductive agent acetylene black, and a binder polyvinylidene fluoride (PVDF) at a ratio of 91.2:4.8:3:1.

The remaining is the same as that in Example 1, and will not be repeated here.

Example 5

Example 5 differs from Example 1 in that: the positive electrode sheet is made by mixing a positive electrode active material A ($LiNi_{0.6}Co_{0.05}Mn_{0.35}O_2$), a positive electrode active material B ($LiNi_{0.33}Co_{0.12}Mn_{0.05}O_2$), a conductive agent acetylene black, and a binder polyvinylidene fluoride (PVDF) at a ratio of 86.4:9.6:3:1.

The remaining is the same as that in Example 1, and will not be repeated here.

Example 6

Example 6 differs from Example 1 in that: the positive electrode sheet is made by mixing a positive electrode active material A ($LiNi_{0.6}Co_{0.05}Mn_{0.35}O_2$), a positive electrode active material B ($LiNi_{0.33}Co_{0.12}Mn_{0.05}O_2$), a conductive agent acetylene black, and a binder polyvinylidene fluoride (PVDF) at a ratio of 81.6:14.4:3:1.

The remaining is the same as that in Example 1, and will not be repeated here.

Example 7

Example 7 differs from Example 1 in that: the positive electrode sheet is made by mixing a positive electrode active material A ($LiNi_{0.6}Co_{0.05}Mn_{0.35}O_2$), a positive electrode active material B ($LiNi_{0.33}Co_{0.12}Mn_{0.05}O_2$), a conductive agent acetylene black, and a binder polyvinylidene fluoride (PVDF) at a ratio of 76.8:19.2:3:1.

The remaining is the same as that in Example 1, and will not be repeated here.

Example 8

Example 8 differs from Example 1 in that: the positive electrode sheet is made by mixing a positive electrode active material A ($LiNi_{0.6}Co_{0.05}Mn_{0.35}O_2$), a positive electrode active material B ($LiNi_{0.33}Co_{0.12}Mn_{0.05}O_2$), a conductive agent acetylene black, and a binder polyvinylidene fluoride (PVDF) at a ratio of 72:24:3:1.

The remaining is the same as that in Example 1, and will not be repeated here.

Example 9

Example 9 differs from Example 1 in that: the positive electrode sheet is made by mixing a positive electrode active material A ($LiNi_{0.6}Co_{0.05}Mn_{0.35}O_2$), a positive electrode active material B ($LiNi_{0.33}Co_{0.12}Mn_{0.05}O_2$), a conductive agent acetylene black, and a binder polyvinylidene fluoride (PVDF) at a ratio of 67.2:28.8:3:1.

The remaining is the same as that in Example 1, and will not be repeated here.

Example 10

Example 10 differs from Example 1 in that: the positive electrode sheet is made by mixing a positive electrode active material A ($LiNi_{0.6}Co_{0.05}Mn_{0.35}O_2$), a positive electrode active material B ($LiNi_{0.75}Co_{0.15}Mn_{0.1}O_2$), a conductive agent acetylene black, and a binder polyvinylidene fluoride (PVDF) at a ratio of 62.4:33.6:3:1.

The remaining is the same as that in Example 1, and will not be repeated here.

Example 11

Example 11 differs from Example 1 in that: the positive electrode sheet is made by mixing a positive electrode active material A ($LiNi_{0.6}Co_{0.05}Mn_{0.35}O_2$), a positive electrode active material B ($LiNi_{0.33}Co_{0.12}Mn_{0.05}O_2$), a conductive agent acetylene black, and a binder polyvinylidene fluoride (PVDF) at a ratio of 57.6:38.4:3:1.

The remaining is the same as that in Example 1, and will not be repeated here.

Example 12

Example 12 differs from Example 1 in that: the positive electrode sheet is made by mixing a positive electrode active material A ($LiNi_{0.6}Mn_{0.4}O_2$), a positive electrode active material B ($LiNi_{0.75}Co_{0.15}Mn_{0.1}O_2$), a conductive agent acetylene black, and a binder polyvinylidene fluoride (PVDF) at a ratio of 81.6:14.4:3:1.

The remaining is the same as that in Example 1, and will not be repeated here.

Example 13

Example 13 differs from Example 1 in that: the positive electrode sheet is made by mixing a positive electrode active material A ($LiNi_{0.6}Mn_{0.4}O_2$), a positive electrode active material B ($LiNi_{0.33}Co_{0.12}Mn_{0.05}O_2$), a conductive agent acetylene black, and a binder polyvinylidene fluoride (PVDF) at a ratio of 81.6:14.4:3:1.

The remaining is the same as that in Example 1, and will not be repeated here.

Example 14

Example 14 differs from Example 1 in that: the positive electrode sheet is made by mixing a positive electrode active material A ($LiNi_{0.65}Mn_{0.35}O_2$), a positive electrode active material B ($LiNi_{0.75}Co_{0.15}Mn_{0.1}O_2$), a conductive agent acetylene black, and a binder polyvinylidene fluoride (PVDF) at a ratio of 86.4:9.6:3:1.

The remaining is the same as that in Example 1, and will not be repeated here.

Example 15

Example 15 differs from Example 1 in that: the positive electrode sheet is made by mixing a positive electrode active material A ($LiNi_{0.65}Mn_{0.35}O_2$), a positive electrode active material B ($LiNi_{0.33}Co_{0.12}Mn_{0.05}O_2$), a conductive agent acetylene black, and a binder polyvinylidene fluoride (PVDF) at a ratio of 86.4:9.6:3:1.

The remaining is the same as that in Example 1, and will not be repeated here.

Comparative Example 1

Comparative Example 1 differs from Example 1 in that: the positive electrode sheet is made by mixing a positive electrode active material $LiNi_{0.55}Co_{0.1}Mn_{0.35}O_2$, a conductive agent acetylene black, and a binder polyvinylidene fluoride (PVDF) at a ratio of 96:3:1.

The remaining is the same as that in Example 1, and will not be repeated here.

Comparative Example 2

Comparative Example 2 differs from Example 1 in that: the positive electrode sheet is made by mixing a positive electrode active material $LiNi_{0.6}Co_{0.05}Mn_{0.35}O_2$, a conductive agent acetylene black, and a binder polyvinylidene fluoride (PVDF) at a ratio of 96:3:1.

The remaining is the same as that in Example 1, and will not be repeated here.

Comparative Example 3

Comparative Example 3 differs from Example 1 in that: the positive electrode sheet is made by mixing a positive electrode active material $LiNi_{0.62}Co_{0.03}Mn_{0.35}O_2$, a conductive agent acetylene black, and a binder polyvinylidene fluoride (PVDF) at a ratio of 96:3:1.

The remaining is the same as that in Example 1, and will not be repeated here.

Comparative Example 4

Comparative Example 4 differs from Example 1 in that: the positive electrode sheet is made by mixing a positive electrode active material $LiNi_{0.6}Mn_{0.4}O_2$, a conductive agent acetylene black, and a binder polyvinylidene fluoride (PVDF) at a ratio of 96:3:1.

The remaining is the same as that in Example 1, and will not be repeated here.

Comparative Example 5

Comparative Example 5 differs from Example 1 in that: the positive electrode sheet is made by mixing a positive electrode active material $LiNi_{0.65}Mn_{0.35}O_2$, a conductive agent acetylene black, and a binder polyvinylidene fluoride (PVDF) at a ratio of 96:3:1.

The remaining is the same as that in Example 1, and will not be repeated here.

Performance Test:

(1) Capacitance Voltage Difference Ratio Q1:Q2 at 45° C.:

First, a lithium ion battery stands still in a constant-temperature environment of 45° C. for 1 hour, and perform 1/1C charge/discharge by a nominal capacity; after the battery being charged to a voltage of 4.35 V at a constant-current charging current of 1C, the battery is charged under the constant voltage of 4.35 V, and a charging cut-off current is 0.05C. The battery stands still for 15 minutes, and then the battery is discharged to 2.8 V at a constant-current discharging current of 1C. Then, perform one 1/1C charge/discharge (performing data recording point sampling by 1 s/time) according to the described steps. Take a second discharge data to calculate a capacity voltage difference ratio, and take a maximum value Q1 in a voltage range of 3.9-4.2 V of a high-nickel H2-H3 phase transition and an intensity value Q2 corresponding to 3.9 V.

(2) 1/3C Capacity Test Method:

A lithium ion battery stands still in a constant-temperature environment of 25° C. for 1 hour; after the battery being charged to a voltage of 4.35 V at a constant-current charging current of 1/3C, the battery is charged under the constant voltage of 4.35 V, and a charging cut-off current is 0.05C. The battery stands still for 15 minutes, and then the battery is discharged to 2.8 V at a constant-current discharging current of 1/3C, wherein the discharge capacity is the capacity of 1/3C of the lithium ion battery; and divide the capacity test value by the mass of a positive electrode material in the lithium ion battery, to obtain 1/3C capacity-per-gram of the positive electrode material.

(3) DCR Test:

First, test a 1C capacity. A lithium ion battery stands still in a constant-temperature environment of 25° C. for 1 hour. Perform 1/1C charge/discharge by a nominal capacity; after the battery being charged to a voltage of 4.35 V at a constant-current charging current of 1C, the battery is charged under the constant voltage of 4.35 V, and a charging cut-off current is 0.05C. The battery stands still for 15 minutes, and then the battery is discharged to 2.8 V at a constant-current discharging current of 1C, wherein the discharge capacity is 1C capacity (C0); then adjust the SOC to 10%, after the battery being charged to 4.35 V by 1C0 constant-current, the battery is charged under the constant voltage of 4.35 V, and a charging cut-off current is 0.05C0, stand still for 15 min, and then perform 1C0 constant-current discharging for 50 min; 10% SOC DCR test at −20° C.: the lithium ion battery stands still in a constant-temperature environment of −20° C. for 2 hour; perform 1/3C discharging for 30 s; and record the voltage at the last second before discharging as V1, and the voltage at 30 s of the discharging as V2, wherein a discharge DCR at −20° C. and 10% SOC is (V1−V2)/(1/3C0).

(4) Cycle Performance Test:

First, perform first charge and discharge in an environment of 45° C., the battery is charged to a voltage of 4.35 V at a constant-current charging current of 1C, the battery is charged under the constant voltage of 4.35 V, and a charging cut-off current is 0.05C, the battery stands still for 15 minutes, and then the battery is discharged to 2.8 V at a constant-current discharging current of 1C, and record a discharge capacity of the first cycle as C1; and then, perform 1000 times of charge and discharge cycles, and record the discharge capacity at the 1000th cycle as C1000, wherein C1000/C1 x100% is recorded as a discharge capacity retention ratio of 1000 cycles of the lithium ion battery.

(5) DCR Increase Test in 1000 Cycles:

A lithium ion battery stands still in a constant-temperature environment of 25° C. for 1 hour, and after a constant-capacity test according to step 3, after the battery being charged to a voltage of 4.35 V at a constant-current charging current of 1C0, the battery is charged under the constant voltage of 4.35 V, and a charging cut-off current is 0.05C0, the battery stands still for 15 minutes, and then the battery is discharged at a constant current for 30 min to adjust to 50% SOC; then, the battery is discharged at a current of 2C0 for 30 s, record the voltage at the last second before discharging as V3, and the voltage at 30 s of the discharging as V4, wherein a discharge DCR1 before the cycle is (V3−V4)/2C0; perform the same test to obtain DCR1000 after 1000 cycles, wherein cycle DCR increase is (DCR1000−DCR1)×100%.

(6) Test of Storage for 200 Days at 60° C.:

Obtain a capacity C0 before storage according to the 25° C. constant-capacity test of step 3; and after the battery is charged fully at a 1C0 constant current and a constant voltage (a charging cutoff voltage being 4.35 V, and a cutoff current being 0.05C0), and store the battery in an environment of 60° C. for 200 days; then the battery stands still at 25° C. for 2 h, the battery is discharged at a current of 1C0 to 2.8 V; and after the battery standing still for 15 min, perform 1/1C0 charge/discharge, to obtain a discharge capacity C2, wherein a storage capacity retention rate at 60° C. is C2/C0×100%.

The differences of the positive electrode sheets of Examples 1-15 and Comparative Examples 1-5 are as shown in the following Table 1.

TABLE 1

| No. | Medium-nickel low-cobalt or cobalt-free positive electrode A | Proportion | High-nickel positive electrode B | Proportion | NCM proportions of positive electrode after mixing |
|---|---|---|---|---|---|
| Example 1 | $LiNi_{0.55}Co_{0.1}Mn_{0.35}O_2$ | 0.90 | $LiNi_{0.75}Co_{0.15}Mn_{0.1}O_2$ | 0.10 | $LiNi_{0.57}Co_{0.105}Mn_{0.325}O_2$ |
| Example 2 | $LiNi_{0.55}Co_{0.1}Mn_{0.35}O_2$ | 0.90 | $LiNi_{0.83}Co_{0.12}Mn_{0.05}O_2$ | 0.10 | $LiNi_{0.578}Co_{0.102}Mn_{0.32}O_2$ |
| Example 3 | $LiNi_{0.55}Co_{0.1}Mn_{0.35}O_2$ | 0.90 | $LiNi_{0.9}Co_{0.06}Mn_{0.04}O_2$ | 0.10 | $LiNi_{0.585}Co_{0.096}Mn_{0.319}O_2$ |
| Example 4 | $LiNi_{0.6}Co_{0.05}Mn_{0.35}O_2$ | 0.95 | $LiNi_{0.83}Co_{0.12}Mn_{0.05}O_2$ | 0.05 | $LiNi_{0.612}Co_{0.054}Mn_{0.335}O_2$ |
| Example 5 | $LiNi_{0.6}Co_{0.05}Mn_{0.35}O_2$ | 0.90 | $LiNi_{0.83}Co_{0.12}Mn_{0.05}O_2$ | 0.10 | $LiNi_{0.623}Co_{0.057}Mn_{0.32}O_2$ |
| Example 6 | $LiNi_{0.6}Co_{0.05}Mn_{0.35}O_2$ | 0.85 | $LiNi_{0.83}Co_{0.12}Mn_{0.05}O_2$ | 0.15 | $LiNi_{0.635}Co_{0.061}Mn_{0.305}O_2$ |
| Example 7 | $LiNi_{0.6}Co_{0.05}Mn_{0.35}O_2$ | 0.80 | $LiNi_{0.83}Co_{0.12}Mn_{0.05}O_2$ | 0.20 | $LiNi_{0.646}Co_{0.064}Mn_{0.29}O_2$ |
| Example 8 | $LiNi_{0.6}Co_{0.05}Mn_{0.35}O_2$ | 0.75 | $LiNi_{0.83}Co_{0.12}Mn_{0.05}O_2$ | 0.25 | $LiNi_{0.658}Co_{0.068}Mn_{0.275}O_2$ |
| Example 9 | $LiNi_{0.6}Co_{0.05}Mn_{0.35}O_2$ | 0.70 | $LiNi_{0.9}Co_{0.06}Mn_{0.04}O_2$ | 0.30 | $LiNi_{0.669}Co_{0.071}Mn_{0.26}O_2$ |
| Example 10 | $LiNi_{0.6}Co_{0.05}Mn_{0.35}O_2$ | 0.65 | $LiNi_{0.75}Co_{0.15}Mn_{0.1}O_2$ | 0.35 | $LiNi_{0.694}Co_{0.062}Mn_{0.245}O_2$ |
| Example 11 | $LiNi_{0.6}Co_{0.05}Mn_{0.35}O_2$ | 0.60 | $LiNi_{0.83}Co_{0.12}Mn_{0.05}O_2$ | 0.40 | $LiNi_{0.704}Co_{0.066}Mn_{0.23}O_2$ |
| Example 12 | $LiNi_{0.6}Mn_{0.4}O_2$ | 0.85 | $LiNi_{0.75}Co_{0.15}Mn_{0.1}O_2$ | 0.15 | $LiNi_{0.623}Co_{0.023}Mn_{0.355}O_2$ |
| Example 13 | $LiNi_{0.6}Mn_{0.4}O_2$ | 0.85 | $LiNi_{0.83}Co_{0.12}Mn_{0.05}O_2$ | 0.15 | $LiNi_{0.635}Co_{0.018}Mn_{0.348}O_2$ |
| Example 14 | $LiNi_{0.65}Mn_{0.35}O_2$ | 0.90 | $LiNi_{0.75}Co_{0.15}Mn_{0.1}O_2$ | 0.10 | $LiNi_{0.66}Co_{0.015}Mn_{0.325}O_2$ |
| Example 15 | $LiNi_{0.65}Mn_{0.35}O_2$ | 0.90 | $LiNi_{0.83}Co_{0.12}Mn_{0.05}O_2$ | 0.10 | $LiNi_{0.668}Co_{0.012}Mn_{0.32}O_2$ |
| Comparative Example 1 | $LiNi_{0.55}Co_{0.1}Mn_{0.35}O_2$ | 1 | / | / | $LiNi_{0.55}Co_{0.1}Mn_{0.35}O_2$ |
| Comparative Example 2 | $LiNi_{0.6}Co_{0.05}Mn_{0.35}O_2$ | 1 | / | / | $LiNi_{0.6}Co_{0.05}Mn_{0.35}O_2$ |
| Comparative Example 3 | $LiNi_{0.64}Co_{0.06}Mn_{0.3}O_2$ | 1 | / | / | $LiNi_{0.64}Co_{0.06}Mn_{0.3}O_2$ |
| Comparative Example 4 | $LiNi_{0.6}Mn_{0.4}O_2$ | 1 | / | / | $LiNi_{0.6}Mn_{0.4}O_2$ |
| Comparative Example 5 | $LiNi_{0.65}Mn_{0.35}O_2$ | 1 | / | / | $LiNi_{0.65}Mn_{0.35}O_2$ |

Performance test was performed on secondary batteries prepared in Example 1-15 and Comparative Examples 1-5, and the test results are recorded in Table 2, wherein in the following performance test items, the unit of 0.33C capacity per gram is mAh/g, and the unit of OCR is mΩ.

TABLE 2

| No. | R | Q1: Q2 | 0.33C capacity per gram | DCR | Cycle capacity retention rate at 45° C. (%) | Cycle DCR increase at 45° C. (%) | Storage capacity retention rate at 60° C. (%) |
|---|---|---|---|---|---|---|---|
| Example 1 | 2.273 | 1.15 | 184.2 | 634 | 92 | 38 | 93 |
| Example 2 | 2.274 | 1.17 | 184.6 | 615 | 92 | 37 | 93 |
| Example 3 | 2.237 | 1.2 | 184.9 | 644 | 91 | 38 | 91 |
| Example 4 | 1.867 | 1.15 | 185.2 | 754 | 90 | 48 | 92 |
| Example 5 | 1.959 | 1.18 | 186.4 | 694 | 90 | 42 | 92 |
| Example 6 | 2.051 | 1.23 | 187.6 | 646 | 89 | 36 | 92 |
| Example 7 | 2.143 | 1.29 | 188.8 | 608 | 88 | 35 | 91 |
| Example 8 | 2.235 | 1.37 | 190.0 | 571 | 86 | 42 | 90 |
| Example 9 | 2.327 | 1.49 | 192.1 | 552 | 84 | 48 | 88 |
| Example 10 | 2.328 | 1.62 | 193.0 | 536 | 80 | 53 | 86 |
| Example 11 | 2.427 | 1.76 | 195.4 | 517 | 76 | 67 | 83 |
| Example 12 | 1.560 | 1.25 | 184.6 | 846 | 87 | 50 | 89 |
| Example 13 | 1.562 | 1.29 | 185.2 | 794 | 87 | 56 | 89 |
| Example 14 | 1.643 | 1.16 | 188.5 | 879 | 88 | 75 | 89 |
| Example 15 | 1.644 | 1.18 | 188.9 | 845 | 88 | 62 | 89 |
| Comparative Example 1 | / | / | 182.0 | 753 | 82 | 52 | 82 |
| Comparative Example 2 | / | / | 184.0 | 841 | 89 | 57 | 92 |
| Comparative Example 3 | / | / | 187.5 | 816 | 88 | 62 | 90 |
| Comparative Example 4 | / | / | 181.2 | 1333 | 88 | 91 | 89 |
| Comparative Example 5 | / | / | 186.8 | 1123 | 87 | 95 | 88 |

From the test results of Examples 1-3 and Comparative Example 1, it can be obviously seen that the positive electrode active material is formed by mixing 90% of $LiNi_{0.55}Co_{0.1}Mn_{3.5}O_2$ with 10% of high-nickel NCM of different composition; after mixing, the nickel content of the NCM positive electrode is slightly improved, and the cobalt content and manganese content do not change obviously, and compared with Comparative Example 1 (the ratio of nickel to cobalt to manganese thereof is close to that of the mixed active material), both low-temperature low-SOC and cycle OCR are greatly improved, however, the high-temperature cycle and storage performance do not deteriorate significantly. By comparing high nickel of different compositions, $LiNi_{0.75}Co_{0.15}Mn_{0.1}O_2$, $LiNi_{0.83}Co_{0.12}Mn_{0.05}O_2$ and $LiNi_{0.9}Co_{0.06}Mn_{0.04}O_2$ have low cobalt contents, high nickel contents, and also relatively large R values, improve low-temperature OCR more obviously, and also have good high-temperature cycle and storage performance.

Examples 4-8 are test results of positive electrodes obtained by mixing $LiNi_{0.6}Co_{0.05}Mn_{0.35}O_2$ and $LiNi_{0.83}Co_{0.12}Mn_{0.05}O_2$ of different ratios; compared with Comparative Example 2, mixing a proportion of 5% of high nickel significantly reduces low-temperature low-SOC OCR. Along with the increase of the proportion of mixed high nickel, low-temperature OCR continuously decreases. But when the proportion of the mixed high nickel is 25% or greater, the magnitude of OCR decrease is limited, and H2-H3 phase transition peak of high-nickel is significantly increased, and high-temperature cycle and storage performance can be significantly reduced.

Figure 2:
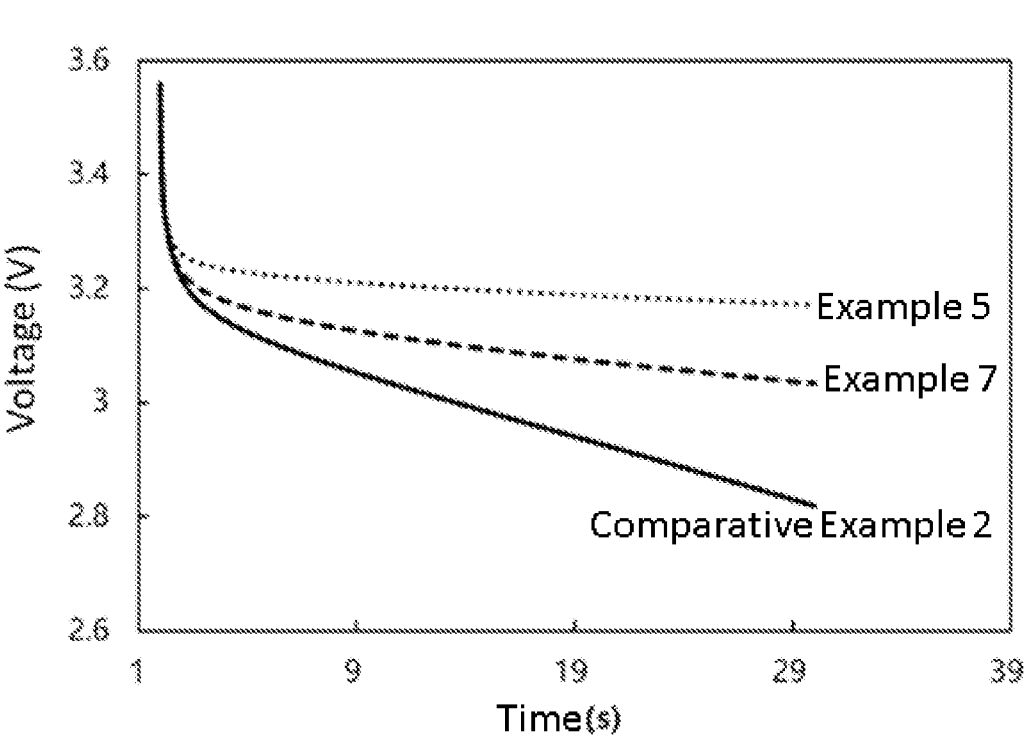
FIG. 2 is a comparison diagram of discharge curves for 30 s at −20° C. 10% SOC of Examples 5 and 7 and Comparative Example 2 of the present disclosure.
Figure 3:
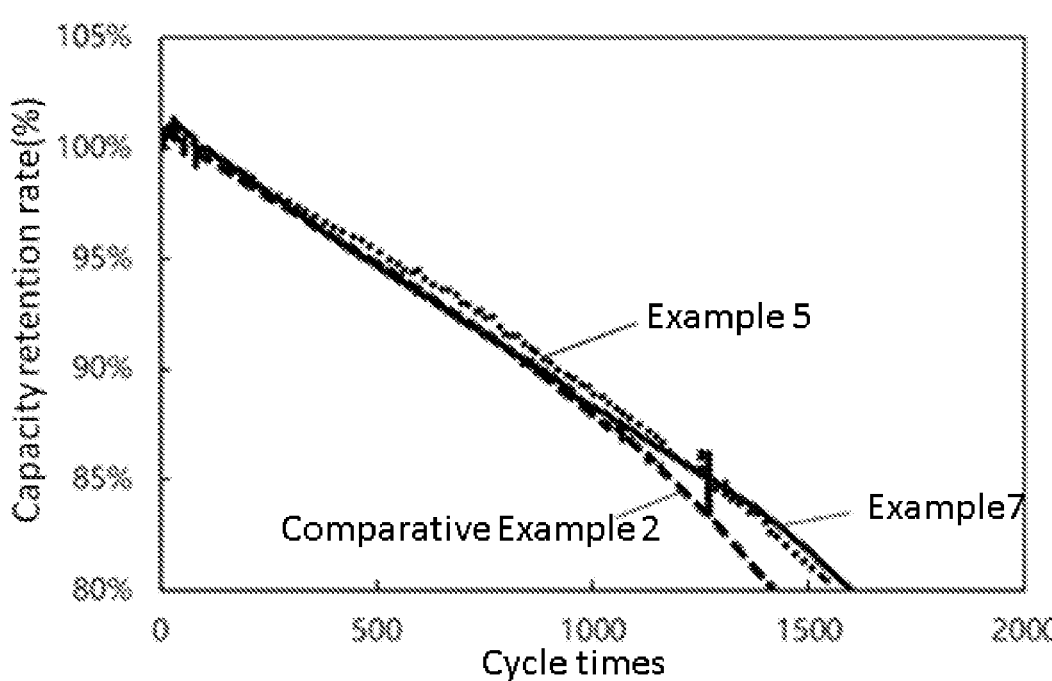
FIG. 3 is a comparison diagram of capacity retention ratio curves under conditions of 45° C., 1/1C cycle and 2.8-4.35 V of Examples 5 and 7 and Comparative Example 2 of the present disclosure.

Comparing Examples 5 and 7 in which $LiNi_{0.6}Co_{0.05}Mn_{0.35}O_2$ is mixed with 10% and 20% of $LiNi_{0.33}Co_{0.12}Mn_{0.05}O_2$ with Comparative Example 2, as shown in FIGS. 1-3, the H2-H3 phase transition strength is in a relatively small range, and at −20° C., due to the dynamic advantage of high nickel, DCR discharge voltage drop at 10% SOC is obviously reduced, and the high-temperature cycle at 45° C. is not obviously reduced. The dQ/dV curve (a differential capacity curve) in FIG. 1 is an effective tool for analyzing the battery state inside a battery, and this method is a method for obtaining internal parameter and state of a battery without disassembling the battery.

By comparing Example 6 with Comparative Examples 2 and 3, the ratio of nickel to cobalt to manganese after mixing in Example 6 is close to that in Comparative Example 3; the capacity per gram in Example 6 is close to that in Comparative Example 3, the DCR at −20° C. and 10% SOC decreases by 21%, the increase of cycle DCR at 45° C. decreases by 20%, and the high-temperature cycle and the storage performance are also obviously improved.

By comparing Examples 9-11, it is obtained that after mixing $LiNi_{0.6}Co_{0.05}Mn_{0.35}O_2$ with high-nickel NCM of a different composition, the nickel content is slightly improved, and good high-temperature cycle and storage performance are achieved.

From Examples 12-13, it is obtained that NCM materials obtained by mixing $LiNi_{0.6}Mn_{0.35}O_2$ with high-nickel NCM of different compositions have good high-temperature cycle and storage performance.

From Examples 14-15, it is obtained that NCM materials obtained by mixing $LiNi_{0.65}Mn_{0.35}O_2$ with high-nickel NCM of different compositions have good high-temperature cycle and storage performance.

By comparing Example 1 and Comparative Examples 1-3, an active material prepared by mixing nickel-cobalt-manganese ternary materials has better high-temperature storage performance and cycle performance than using a single nickel-cobalt-manganese ternary material.

From Example 1, Comparative Examples 4 and 5, it is obtained that compared with a nickel-manganese binary material, an active material prepared by nickel-cobalt-manganese ternary materials has better high-temperature storage performance and cycle performance.

According to the disclosure and teaching of the description above, a person skilled in the art to which the present disclosure belongs would also have been able to make changes and modifications to the embodiments above. Therefore, the present disclosure is not limited to the described specific embodiments, and any obvious improvements, replacements or modifications made by a person skilled in the art on the basis of the present disclosure shall all belong to the scope of protection of the present disclosure. In addition, although some specific terms are used in the present description, these terms are merely used for convenience of description and do not constitute any limitation on the present disclosure.

What is claimed is:

1. A battery, wherein a capacity voltage difference ratio of the battery in a capacity test at 45° C. and 1/1C, which is the ratio of an intensity maximum value Q1 between a high-nickel H2-H3 phase transition peak 3.9-4.2 V to an intensity Q2 at 3.9 V of the battery, satisfies $1<Q1:Q2\leq1.6$; the battery comprises a positive electrode sheet, the positive electrode sheet comprises a positive electrode current collector and a positive electrode coating provided on at least one surface of the positive electrode current collector, and the positive electrode coating comprises a positive electrode active material, the positive electrode active material comprises a transition metal oxide A and a transition metal oxide B, a chemical formula of the transition metal oxide A is $Li_{a1}(Ni_{x1}CO_{y1}Mn_{z1}G_{b1})O_{2-c1}D_{c1}$, in the formula, $0.8\leq a1\leq1.2$, $0.5\leq x1\leq0.65$, $0\leq y1<0.13$, $0.23<z1\leq0.5$, $0\leq b1\leq0.1$,

15

$0 \leq c1 < 0.1$, $x1+y1+z1+b1=1$, G is one or more of Mg, Ca, Ce, Y, Al, Sn, Ti, Zr, W, Sr, La, Ba, Co, Mo, Cr and B; D is one or more of N, F, S, Cl, Br and I; a chemical formula of the transition metal oxide B is $Li_{a2}(Ni_{x2}Co_{y2}Mn_{z2}M_{b2})O_{2-c2}E_{c2}$, $0.8 \leq a2 \leq 1.2$, $0.75 \leq x2 < 1$, $0 < y2 < 0.13$, $0 \leq z2 \leq 0.25$, $0 \leq b2 \leq 0.1$, $0 \leq c2 \leq 0.1$, $x2+y2+z2+b2=1$, M is one or more of Mg, Ca, Ce, Y, Al, Sn, Ti, Zr, W, Sr, La, Ba, Co, Mo, Cr and B; and E is one or more of N, F, S, Cl, Br and I; $3(m*x1+n*x2)+10(m*y1+n*y2)-1.5(m*z1+n*z2)=R$, $1.2 \leq R < 3.5$, where m and n represent mass fractions of the transition metal oxide A and the transition metal oxide B, respectively; a parts by weight ratio of the transition metal oxide A to the transition metal oxide B is (0.7-0.99):(0.01-0.3).

2. The battery according to claim 1, wherein a particle size distribution of the positive electrode active material satisfies: $Dv_{10} \geq 0.5$ μm and $2$ μm$\leq Dv_{50} \leq 7$ μm.

3. The battery according to claim 1, wherein a particle size distribution of the positive electrode active material satisfies: $0.5 < (Dv_{90}-Dv_{10})/Dv_{50} < 4$.

4. The battery according to claim 1, wherein at least a part of the positive electrode active material is in a single crystal or single crystal-like morphology.

5. The battery according to claim 1, wherein a compaction density of the positive electrode coating is 3.1 g/cm$^3$-3.7 g/cm$^3$.

6. The battery according to claim 1, wherein the positive electrode coating comprises raw materials of the following parts by weight: 80-99 parts of the positive electrode active material, 0.5-10 parts of a binder and 0.5-10 parts of a conductive agent.

7. The battery according to claim 6, wherein the positive electrode coating comprises raw materials of the following parts by weight: 93-99 parts of a positive electrode active material, 1-4 parts of the binder and 1-3 parts of the conductive agent.

8. An electric device, comprising the battery according to claim 1.

9. The electric device according to claim 8, wherein a particle size distribution of the positive electrode active material satisfies: $Dv_{10} \geq 0.5$ μm and $2$ μm$\leq Dv_{50} \leq 7$ μm.

10. The electric device according to claim 8, wherein a particle size distribution of the positive electrode active material satisfies: $0.5 < (Dv_{90}-Dv_{10})/Dv_{50} < 4$.

11. The electric device according to claim 8, wherein at least a part of the positive electrode active material is in a single crystal or single crystal-like morphology.

12. The electric device according to claim 8, wherein a compaction density of the positive electrode coating is 3.1 g/cm$^3$-3.7 g/cm$^3$.

13. The electric device according to claim 8, wherein the positive electrode coating comprises raw materials of the following parts by weight: 80-99 parts of the positive electrode active material, 0.5-10 parts of a binder and 0.5-10 parts of a conductive agent.

14. The electric device according to claim 8, wherein the positive electrode coating comprises raw materials of the following parts by weight: 93-99 parts of a positive electrode active material, 1-4 parts of the binder and 1-3 parts of the conductive agent.

* * * * *